United States Patent Office

2,764,487
Patented Sept. 25, 1956

2,764,487

NUTRITIVE YEAST PRODUCTS

Lynferd J. Wickerham and Calvin C. Kuehner, Peoria, Ill., assignors to the United States of America as represented by the Secretary of Agriculture No Drawing. Application March 13, 1953,
Serial No. 342,299

15 Claims. (Cl. 99—96)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to the production of food materials having enhanced protein and vitamin content. It relates more particularly to methods for enriching food materials by biological processes involving the yeast species, *Endomycopsis fibuliger* and *Endomycopsis (candida) chodati*, either singly or in combination with each other or with other yeasts.

The protein and vitamin substances of yeast cells have long been known as a valuable nutritive material, and has frequently been used to enrich food and feed compositions. This use has been restricted, however, because of the high cost of the yeast preparations. The yeast previously used in preparing such nutritive materials are of types which cannot utilize cheaper and more abundant starch-containing commodities, but require instead relatively simple sugars such as dextrose, maltose or sucrose as a source of assimilable carbon. These prior yeast preparations are hence made by growing living yeast cells in media containing materials such as molasses, wood hydrolysates, and the like. Starch, if used in yeast production by prior methods must first be hydrolyzed to dextrose or maltose.

According to this invention, yeasts of the *Endomycopsis fibuliger* and *Endomycopsis (candida) chodati* species are utilized to produce yeast preparations directly from amylaceous substances. This is possible because these two species are peculiar among yeasts in their ability to produce an extracellular enzyme system which will break down starch, rendering it available for cell growth by that same organism, or by any other yeast which happens to be present in the culture medium. The process of this invention thus makes possible the cheap conversion of abundant amylaceous materials into nutritive foods or feeds containing the important, yet relatively scarce food element, protein. Thus grains, tubers and the like as such, or in the form of waste materials from grain or tuber processing plants, may be utilized as the chief source of assimilable carbon for yeast growth, and may hence be converted to highly desirable food materials.

According to one phase of the present invention the two yeasts species previously named, either alone or in combination are cultured in a starch-containing medium such as a mash made up of waste streams from grain wet-milling plants, wastes from potato dehydrating plants or the like.

The fermentations according to this invention are carried out in the presence of a suitable source of assimilable nitrogen. This may be any of the substances conventionally employed for such purposes such as corn steep liquor, distillers solubles, protein hydrolyzates, urea, ammonia, ammonia salts, nitrate salts, and the like.

The fermentations should also be provided with the conventional nutrient minerals such as potassium dihydrogen phosphate, magnesium sulfate, calcium carbonate, and the like. The fermentations are not unduly sensitive to variations in quantity of the nutrient minerals. In the majority of instances wherein crude amylaceous or nitrogenous materials are used, the necessary minerals are present in sufficient quantity to support satisfactory yeast growth; so that it is unnecessary to add further quantities.

Although it is necessary to carry out the fermentations under aerobic conditions, the rate of aeration is not a critical factor, so long as sufficient air is supplied to provide the growing yeast organisms with a substantial amount of oxygen. We have found, however, that the degree of agitation has a marked effect upon the results obtained by the present invention. For example, the net yield of synthesized protein appears to depend upon the degree of agitation. Data presented below shows that optimum results are obtainable under vigorous agitation in which the whole volume of mash is maintained in a state of continual movement.

In general the conditions of the fermentation require first, a mash containing an amylaceous substance, preferably one of the abundantly available materials previously mentioned, or mixtures thereof. The total starch content of the mash may vary over the range of from 0.25 to 25 percent of the mash. Within this range, concentrations of 5 to 10 percent are more desirable from the standpoint of equipment requirements and also from the standpoint of actual conversion based on the proportional increase of protein in the final product due to the fermentation.

The source of assimilable nitrogen in the mashes may vary from 0.05 to 10 percent of the mash, any of the previously mentioned substances being satisfactory.

The aeration rate, as previously explained, may vary between wide limits as for example from ¼ volume of air per volume of mash per minute, up to as much as 20 times that amount. The pH of the mash should be no lower than 3.0 nor higher than 8.0. Moderate pH values of 4.0 to 6.5, i. e., slightly acid, are preferred.

The process described in the foregoing paragraphs may be modified in accordance with the invention, by using either of the two previously-mentioned yeasts in combination with other ancillary food yeasts providing greater proportions of such nutritive factors as vitamins and essential amino acids. Other yeasts such as Torulopsis utilis may be used in combination to provide an improved total yield of protein. In such modifications, it is to be understood that the ancillary yeasts depend upon the amylolytic action of E. fibuliger and E. (candida) chodati for their source of assimilable carbon, which they require in the hydrolyzed or sugar form.

Further modifications may be made by separately culturing the two amylolytic yeasts to produce high amylase liquors and then using these liquors either with or without separation of cells and other suspended solids, to convert starchy substrates for subsequent growth of food or feed yeasts.

The various modifications of the invention may be carried out in a wide variety of ways. For example, although batch operations are suitable and successful, certain advantages may be realized by continuous processing. Thus, when employing Torulopsis utilis or other non-amylase producing food yeast with the amylolytic yeasts, diastatically active liquid (backslop) from the process may be mixed with the starch-containing mash, to accomplish partial hydrolysis. This treated material is then used as feed for the yeast propagators in which the amylolytic yeast and the ancillary yeast are grown.

This procedure of backslopping may be operated continuously as follows: The starch-containing material such as macerated potatoes, ground corn, wheat, or the like is first mixed with an initial amount of backslop and the mixture heated to optimum temperatures between 15° and 90° C., to gelatinize the starch and reduce viscosity. Then more backslop is added to drop the temperature to say 55° C., whereupon the amylase in the backslop will convert much of the starch to sugar. The converted mash is then fed continuously to the yeast propagators. The propagators also receive a continuous supply of nutrient salts and simple nitrogenous materials. Aeration and agitation are provided to stimulate the growth of yeast cells. Liquid containing the yeast, amylase, and minor amounts of residual nutrients is continuously removed from the propagator to a second propagator or storage tank, and from there it is led to centrifugals which separate the solids from the major part of the liquid. The solids, a highly nutritive yeast product, may then be dried for storage and later used as food or feed or otherwise treated as desired. The liquid is returned to the initial stage of the process as backslop.

The following examples illustrate specific methods of carrying out the invention and factors relating to such methods.

EXAMPLE 1

A series of batch experiments were carried out utilizing various combinations of yeast species. Stainless steel propagators were charged with a 5-percent ground wheat mash containing 0.25 percent urea, 0.25 percent ammonium phosphate or equivalent amounts of ammonium sulfate, 0.10 percent potassium dihydrogen phosphate, 0.05 percent magnesium sulfate, and 0.001 percent calcium carbonate. The mash was inoculated with the yeast and maintained at pH approximately 5.0 at 33° to 34° C. for 8 hours. The mashes were agitated with a propeller agitator with a speed of 650 R. P. M. and were aerated at the rate of 1 volume of air per volume of mash per minute. The results are summarized in Table I.

Table I

| Exp. No. | Yeasts | Percent efficiency dry wt. basis | Percent increase in protein | Percent protein in cent. solids |
|---|---|---|---|---|
| 1 | Y-2052+Y-1084 | 58.5 | 58.4 | 29.0 |
| 2 | Y-25+Y-1084 | 52.9 | 47.2 | 29.8 |
| 3 | Y-1062+Y-1084 | 48.0 | 47.6 | 32.9 |
| 4 | Y-1062+Y-900 | 59.6 | 47.6 | 26.5 |
| 5 | Y-1062+Y-1084 | 59.5 | 68.6 | 28.9 |
| 6 | Y-1062+Y-1094 | 63.3 | 57.8 | 25.4 |
| 7 | Y-1062+Y-1542 | 58.6 | 56.6 | 27.2 |
| 8 | Y-1062+Y-1591 | 62.5 | 59.6 | 26.1 |
| 9 | Y-1062+Y-1084 | 57.8 | 56.5 | 27.1 |
| 10 | Y-1062+Y-2055 | 58.1 | 57.3 | 26.8 |
| 11 | Y-1062+Y-1109 | 53.3 | 31.0 | 24.4 |
| 12 | Y-2051+Y-1084 | 65 | 98.2 | 30.6 |
| 13 | Y-1938+Y-1084 | 59 | 93.4 | 32.8 |
| 14 | Y-259+Y-1084 | 40 | 15.4 | 29.2 |

The percent increase in protein given in the foregoing table is the weight of protein produced from 100 parts by weight of dry raw materials less the weight of protein in the raw materials divided by the weight of protein in the raw materials multiplied by 100.

The names of the yeasts employed in the foregoing example are as follows:

Table II

Y-2052—Endomycopsis (candida) chodati
Y-1084—Torulopsis utilis var. major
Y-25 —Endomycopsis fibuliger
Y-1062—Endomycopsis fibuliger
Y-900 —Torulopsis utilis
Y-1094—Candida lipolytica
Y-1542—Hansenula jadinii
Y-1591—Rhodotorula mucilaginosa
Y-2055—Hansenula anomala
Y-1109—Saccharomyces fragilis
Y-2051—Endomycopsis (candida) chodati
Y-1938—Endomycopsis (candida) chodati
Y-259 —Endomycopsis (candida) chodati

EXAMPLE 2

This example shows the effect of the concentration of amylaceous material upon the yield of synthesized protein. A series of fermentations were carried out under identical conditions of aeration and agitation, but in which the amounts of ground wheat were varied as indicated in the table below. Stainless steel propagators equipped with agitators and air spargers were used, the agitation being operated at 650 R. P. M. and air being introduced at the rate of 1 volume air/volume mash/min. The mashes were inoculated with a mixed culture of E. fibuliger Y-1062, and T. utilis Y-1084. The quantity of nitrogen source was proportioned to the quantity of wheat supplied. The length of time of the fermentations was 8 hours.

Table III

| Percent wheat conc. | Lbs. solids obtained from 100 lbs. raw material | Lbs. protein synthesized | Percent protein in solids | Percent increase in protein due to processing | Residual N in supernatant | Residual starch in 100 ml. supernatant |
|---|---|---|---|---|---|---|
| 9.5 | 79.8 | 10.5 | 28.5 | 86.2 | .338 | 3.31 |
| 7.2 | 81.6 | 10.7 | 27.7 | 89.5 | .239 | .247 |
| 5.2 | 70.2 | 8.1 | 26.8 | 75.7 | .143 | .929 |
| 3.1 | 50.7 | 5.5 | 31.3 | 52.4 | .044 | .790 |

EXAMPLE 3

This example illustrates the effects of aeration and agitation rates on the efficiency of the protein synthesis. The procedure of Example 2 was repeated with the exception that the quantity of wheat in the mashes was kept constant at 5 percent and the aeration and agitation rates were varied as shown in the table below.

Table IV

|  | Lbs. solids obtained from 100 lbs. raw material | Lbs. protein synthesized from 100 lbs. raw material | Percent protein in solids | Percent increase in protein due to processing | Residual nitrogen in 100 ml. supernatant | Residual starch in 100 ml. supernatant |
|---|---|---|---|---|---|---|
| 800 R. P. M.: | | | | | | |
| ½ | 58.52 | 7.9 | 32.0 | 73.4 | .120 | .684 |
| 1 | 60.0 | 8.5 | 32.2 | 79.1 | .116 | .686 |
| 1½ | 60.5 | 8.5 | 31.9 | 78.7 | .122 | .698 |
| 2 | 61.1 | 7.9 | 30.6 | 73.4 | .124 | .711 |
| 650 R. P. M.: | | | | | | |
| ½ vol./vol./min | 62.6 | 6.8 | 28.6 | 60.8 | .200 | 1.020 |
| 1 vol./vol./min | 61.3 | 6.7 | 28.7 | 61.2 | .157 | .741 |
| 1½ vol./vol./min | 62.2 | 7.4 | 29.5 | 67.7 | .152 | .706 |
| 2 vol./vol./min | 63.7 | 8.3 | 30.2 | 75.8 | .144 | .619 |
| 500 R. P. M.: | | | | | | |
| ½ | 58.9 | 4.0 | 24.9 | 37.7 | .160 | 1.35 |
| 1 | 61.0 | 4.8 | 25.3 | 44.7 | .151 | 1.38 |
| 1½ | 61.5 | 5.0 | 25.5 | 47.0 | .150 | 1.20 |
| 2 | 60.2 | 5.5 | 26.8 | 51.7 | .145 | .887 |
| 350 R. P. M.: | | | | | | |
| ½ | 52.0 | 2.1 | 25.1 | 19.1 | .182 | 1.45 |
| 1 | 57.2 | 2.2 | 23.1 | 20.5 | .176 | 1.40 |
| 1½ | 59.5 | 2.5 | 22.6 | 22.8 | .162 | 1.33 |
| 2 | 62.7 | 3.7 | 23.4 | 33.8 | 1.65 | 1.32 |

From the foregoing it may be seen that an increase in the rate of agitation increases materially the percent of protein synthesized as well as the total yield of protein, whereas variation in aeration rate has comparatively little effect.

EXAMPLE 4

This example illustrates the relative value of various amylaceous substances as substrates in the process of the invention. The process of Example 2 was repeated, using 5 to 6 percent mashes of the materials indicated in the table below. The agitation rate was maintained at 650 R. P. M. and the aeration rate at 1 volume air/volume mash/minute.

In the table, the values reported for the backslopped runs were obtained by varying the fermentations as illustrated in Example 5.

Table V

|  | Lbs. solids obtained from 100 lbs. raw material | Lbs. protein synthesized from 100 lbs. raw material | Percent protein in cent. solids | Percent increase in protein | Residual N in 100 ml. supernatant | Starch residual in 100 ml. supernatant |
|---|---|---|---|---|---|---|
| Sweet potatoes | 91.8 | 13.5 | 22.4 | 192.1 | .080 | 1.095 |
| Sweet potatoes backslopped | 47.8 | 8.9 | 33.5 | 126.7 | .085 | 1.510 |
| White potatoes | 60.7 | 10.8 | 30.5 | 141.5 | .107 | .300 |
| White potatoes backslopped | 51.4 | 11.1 | 36.5 | 144.5 | .710 | 1.51 |
| Corn | 59.7 | 1.4 | 19.5 | 13.8 | .091 | 1.40 |
| Corn backslopped | 45.8 | 3.5 | 29.0 | 33.9 | .166 | 2.49 |
| Rice | 44.4 | 0.9 | 15.5 | 15.5 | .095 | 2.46 |
| Rice backslopped | 37.2 | 5.7 | 30.0 | 95.0 | .130 | 1.68 |

Table VI

| Backslopping cycle | Lbs. Solids obtained from 100 lbs. raw material | Lbs. protein synthesized | Percent Protein in solids | Percent Increase in protein due to processing | Residual nitrogen in 100 ml. supernatant | Residual starch in supernatant |
|---|---|---|---|---|---|---|
| 1 | 68.5 | 7.3 | 27.6 | 62.6 | .115 | .624 |
| 2 | 62.1 | 7.8 | 31.3 | 67.2 | .149 | .917 |
| 3 | 65.0 | 6.2 | 27.7 | 53.3 | .154 | .775 |
| 4 | 56.7 | 6.9 | 32.7 | 59.4 | .183 | .958 |
| 5 | 59.8 | 4.8 | 27.5 | 41.1 | .201 | .439 |
| 6 | 52.5 | 1.5 | 25.0 | 12.9 | .176 | .979 |

EXAMPLE 5

A series of fermentations were carried out as in Example 2, using 5 percent ground wheat mashes wtih agitation rates of 650 R. P. M. and aeration rates of 1 volume air/volume mash/minute. At the end of each 8-hour fermentation the solids were separated from the liquids, the liquid, containing the diastatic enzymes and other solubles from the fermentation, was used to make up 60 percent of the total mash volume for a subsequent fermentation. This backslopping was repeated through 6 cycles, and the results are tabulated below.

EXAMPLE 6

This example illustrates the process of this invention in which an osmophilic, nonamylase-producing yeast is present in the fermentation. Example 5 was repeated, except that comparative runs were made in which *Hansenula subpelliculosa* Y-1683 was present instead of *T. utilis* Y-1084. The results are tabulated below.

Table VII

| | Lbs. solids | Lbs. Protein synthesized | Percent Protein in solids | Percent Increase in protein due to processing | Residual N | Residual starch |
|---|---|---|---|---|---|---|
| No backslop: | | | | | | |
| Y1683 | 73.7 | 8.2 | 27.6 | 66.2 | .144 | .545 |
| Y1084 | 77.0 | 8.5 | 27.1 | 68.7 | .179 | .288 |
| Backslop—once recycled: | | | | | | |
| Y1683 | 56.9 | 9.8 | 32.4 | 112.7 | .172 | 1.477 |
| Y1084 | 49.7 | 5.6 | 28.6 | 69.3 | .200 | 1.017 |
| Backslop—six times recycled: | | | | | | |
| Y1683 | 54.6 | 8.6 | 27.7 | 31.0 | .194 | 1.82 |
| Y1084 | 50.0 | 1.3 | 26.0 | 11.5 | .225 | 1.31 |

We claim:

1. The method of producing yeast food preparations comprising cultivating an amylase-producing yeast of the group consisting of *Endomycopsis fibuliger* and *Endomycopsis (candida) chodati* in a culture medium comprising an amylaceous material as chief source of assimilable carbon, and a source of assimilable nitrogen, maintaining said culture medium in a condition of substantial aeration and agitation until a substantial quantity of the amylaceous material has been utilized by the yeast organisms, and recovering the insolubles including yeast cells from the culture medium.

2. The method of claim 1 in which the amylase producing yeast is *Endomycopsis fibuliger*.

3. The method of claim 1 in which the amylase producing yeast is *Endomycopsis (candida) chodati*.

4. The method of claim 1 in which the rate of agitation is sufficiently vigorous to maintain the whole volume of mash in a state of continual movement.

5. The method of claim 4 in which the fermentation is carried out in the presence of a non-amylase-producing food yeast selected from the group consisting of *Torulopsis utilis* and *Hansenula subpelliculosa*.

6. The method of producing a nutrient material rich in protein and vitamins comprising cultivating an amylase-producing yeast of the group consisting of *Endomycopsis fibuliger* and *Endomycopsis (candida) chodati* in a mash containing an amylaceous material as chief source of assimilable carbon, and a source of assimilable nitrogen, maintaining said culture medium in a condition of substantial aeration and agitation until a substantial quantity of the amylaceous material has been utilized by the yeast organisms, recovering the insolubles including yeast cells from the culture medium containing amylase, forming a succeeding mash by mixing the separated culture medium with more amylaceous material and permitting the succeeding mash to stand to accomplish partial hydrolysis, and then mixing said succeeding mash with a culture of yeast organisms comprising said amylase producing yeast organisms and maintaining said mash in a condition of substantial aeration and agitation through a succeeding cycle of yeast growth and recovering the insolubles including yeast cells from the mash.

7. The method of claim 6 in which the yeast organisms comprise *Endomycopsis fibuliger* and *Torulopsis utilis*.

8. The method of claim 7 in which the amylaceous material is sweet potatoes.

9. The method of claim 7 in which the amylaceous material is white potatoes.

10. The method of claim 7 in which the amylaceous material is a cereal grain material.

11. The method of producing a nutrient material rich in proteins and vitamins comprising cultivating an amylase-producing yeast of the group consisting of *Endomycopsis fibuliger* and *Endomycopsis (candida) chodati* in the presence of a non-amylase-producing food yeast selected from the group consisting of *Torulopsis utilis* and *Hansenula subpelliculosa* in a culture medium comprising an amylaceous material as chief source of assimilable carbon and a source of assimilable nitrogen, maintaining said culture medium in a condition of aeration and agitation until most of the amylaceous material has been utilized by the yeast organisms, and recovering the insolubles including yeast cells from the culture medium.

12. The method of claim 11 in which the amylase producing yeast is *Endomycopsis fibuliger*.

13. The method of claim 11 in which the amylase producing yeast is *Endomycopsis (candida) chodati*.

14. The method of claim 12 in which the nonamylase producing yeast is *Torulopsis utilis*.

15. The method of claim 12 in which the nonamylase producing yeast is *Hansenula subpelliculosa*.

References Cited in the file of this patent

UNITED STATES PATENTS

| 540,471 | Wahl et al. | June 4, 1895 |
| 1,044,446 | Fernbach | Nov. 12, 1912 |
| 1,909,011 | Riley | May 16, 1933 |
| 1,962,831 | Moskovitz | June 12, 1934 |
| 2,422,455 | Wickerham | June 17, 1947 |

OTHER REFERENCES

Guilliermond: The Yeasts, 1920, Wiley, page 62.

Sumner et al.: Vol. I, part 1, Academic Press Inc., 1950, page 697.

Porges: Abstract 726, 945, Pub. Jan. 16, 1951, in 37 O. G. 757.